United States Patent
Roffet

(10) Patent No.: US 9,374,510 B2
(45) Date of Patent: Jun. 21, 2016

(54) TONE MAPPING METHOD

(71) Applicant: STMicroelectronics (Grenoble 2) SAS, Grenoble (FR)

(72) Inventor: Gregory Roffet, Coublevie (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 148 days.

(21) Appl. No.: 14/203,917

(22) Filed: Mar. 11, 2014

(65) Prior Publication Data

US 2014/0267822 A1     Sep. 18, 2014

(30) Foreign Application Priority Data

Mar. 12, 2013   (FR) ...................................... 13 52164

(51) Int. Cl.
| | |
|---|---|
| *G06K 9/00* | (2006.01) |
| *H04N 5/225* | (2006.01) |
| *G06T 5/00* | (2006.01) |
| *G06T 5/40* | (2006.01) |

(52) U.S. Cl.
CPC ............... *H04N 5/225* (2013.01); *G06T 5/009* (2013.01); *G06T 5/40* (2013.01); *G06T 2207/20208* (2013.01)

(58) Field of Classification Search
CPC ..................... G06T 2207/20208; G06T 5/009; G06T 5/40; H04N 5/225
See application file for complete search history.

(56) References Cited

U.S. PATENT DOCUMENTS

| | | | |
|---|---|---|---|
| 2005/0117799 A1* | 6/2005 | Fuh .......................... | G06T 5/009 382/169 |
| 2009/0317017 A1 | 12/2009 | Au et al. | |
| 2010/0157078 A1* | 6/2010 | Atanassov .............. | G06T 5/007 348/222.1 |
| 2010/0278423 A1 | 11/2010 | Itoh et al. | |

FOREIGN PATENT DOCUMENTS

WO       2012/118961 A1     9/2012

OTHER PUBLICATIONS

Duan, J., et al., "Tone-mapping high dynamic range images by novel histogram adjustment," Pattern Recognition 43 (2010) pp. 1847-1862.

Duan, J., et al., "Fast Tone Mapping for High Dynamic Range Images," ICPR '04 Proceedings of the Pattern Recognition, 17th International Conference, vol. 2, pp. 847-850.

\* cited by examiner

*Primary Examiner* — Phuoc Tran
(74) *Attorney, Agent, or Firm* — Seed IP Law Group PLLC

(57) ABSTRACT

Generating by a digital processing device, of a first digital image from a second digital image, by: for each pixel of the second image, determining a pixel luminance; dividing the interval ranging from the lowest to the highest luminance into a plurality of sub-intervals; and determining the value of at least one pixel of the first image by multiplying the value of a pixel of the second image by a gain determined by interpolation by taking into account the distance of the pixel luminance of the second image to the limits of the sub-interval containing this luminance.

24 Claims, 1 Drawing Sheet

TONE MAPPING METHOD

BACKGROUND

1. Technical Field

The present disclosure generally relates to the processing of digital images, including tone mapping.

2. Description of the Related Art

In tone mapping, a group of digital image processing techniques are used, for example, to generate, from a high dynamic range image where a large number of different tones (or degrees of intensity) are available to depict a scene, an image of lower dynamic range where a smaller number of tones is available to depict the scene.

Tone mapping techniques may be used in combination with methods for obtaining high dynamic range images where several images of a same scene are successively acquired with different sensor integration times, after which these images are merged into a high dynamic range image where the values of the pixels corresponding to the darkest areas of the scene are based on the values of the corresponding pixels of the images acquired with the highest integration times, and the values of the pixels corresponding to the brightest areas of the scene are based on the values of the corresponding pixels of the images acquired with the shortest integration times. The high dynamic range image may be coded over a relatively large number of bits. To make this image compatible with equipment having but a limited number of tones to depict a scene (for example, a display device), it may be provided to use tone mapping techniques to decrease the dynamic range of the image while keeping the appearance of a high dynamic range image.

Tone mapping techniques may also be used to modify the tone distribution in an image without decreasing its dynamic range, for example, to apply special effects, a gamma function, etc.

BRIEF SUMMARY

An embodiment provides a method of generation, by a digital processing device, of a first digital image from a second digital image, comprising: a) for each pixel of the second image, determining a pixel luminance; b) dividing the interval ranging from the lowest to the highest luminance into a plurality of sub-intervals; and c) determining the value of at least one pixel of the first image by multiplying the value of a pixel of the second image by a gain determined by interpolation by taking into account the distance of the pixel luminance of the second image to the limits of the sub-interval containing this luminance.

According to an embodiment, the method further comprises, between step a) and step b), a step of calculation of a first histogram H representative of the distribution of luminance values in the second image.

According to an embodiment, the first histogram is subsampled, that is, it comprises a number of discrete values smaller than the total number of discrete values that the luminance values of the second image may take.

According to an embodiment, the method further comprises determining a second cumulative histogram from the first histogram.

According to an embodiment, at step b), the division of the interval into sub-intervals is a dichotomous division where, at each step of division of an interval or sub-interval ranging from a value $L_{min}$ to a value $L_{max}$: an intermediate value $\beta$ of the interval or sub-interval is determined, such that:

$$\sum_{k=L_{min}}^{\beta} H(k) = \sum_{k=\beta}^{L_{max}} H(k),$$

where k designates the luminance values for which a histogram value H(k) has been calculated; and a cut point C of the initial interval or sub-interval is determined, such that:

$$C = \frac{L_{max} + L_{min}}{2} + \alpha \left( \beta - \frac{L_{max} + L_{min}}{2} \right)$$

where $\alpha$ designates a control parameter greater than or equal to 0 and smaller than or equal to 1.

According to an embodiment, control parameter a ranges between 0.4 and 0.6.

According to an embodiment, at step b), the number of sub-intervals into which said interval is divided is smaller than the number of values capable of being taken by each pixel in the first image.

According to an embodiment, the first and second images are mosaic color images, where the value of each pixel represents the level of a single color of a color base, for example, the red, green, and blue base.

According to an embodiment, the pixels of the first and second images are gathered in elementary macroblocks of pixels having the same base color distribution pattern.

According to an embodiment, at step a), the luminance value determined for each pixel is proportional to a weighted average of the values of the pixels of the macroblock containing this pixel.

According to an embodiment, at step c), the same gain is applied to all the pixels of a same macroblock of the second image.

According to an embodiment, the values of the pixels of the first image are coded over a smaller number of bits than the values of the pixels of the second image.

Another embodiment provides a method for generating a first image from a second image, comprising processing circuits capable of implementing a method of the above-mentioned type.

In an embodiment, a method comprises: generating, using a configured digital processing device, a first digital image from a second digital image, by: determining a luminance value of each pixel of the second image; dividing a luminance interval ranging from a lowest determined luminance value to a highest determined luminance of the pixels of the second image into a plurality of sub-intervals; and determining a luminance value of at least one pixel of the first image by multiplying the determined luminance value of a pixel of the second image by a gain determined by interpolation based on a distance of the luminance value of the pixel of the second image to limits of a sub-interval containing the determined luminance value of the pixel of the second image. In an embodiment, the method includes generating a first histogram H representative of a distribution of luminance values in the second image. In an embodiment, the first histogram comprises a number of discrete values smaller than a total number of available discrete values for luminance values of the second image. In an embodiment, the method includes determining a second cumulative histogram based on the first histogram. In an embodiment, dividing the luminance interval into sub-intervals comprises dichotomous division in which, at each step of division of an initial interval or sub-interval ranging from a value $L_{min}$ to a value $L_{max}$:

an intermediate value β of the interval or sub-interval is determined, such that:

$$\sum_{k=L_{min}}^{\beta} H(k) = \sum_{k=\beta}^{L_{max}} H(k),$$

where k designates luminance values for which a histogram value H(k) has been calculated; and a cut point C of the initial interval or sub-interval is determined, such that:

$$C = \frac{L_{max} + L_{min}}{2} + \alpha\left(\beta - \frac{L_{max} + L_{min}}{2}\right)$$

where α designates a control parameter greater than or equal to 0 and smaller than or equal to 1. In an embodiment, the control parameter α ranges between 0.4 and 0.6. In an embodiment, a number of sub-intervals into which said interval is divided is smaller than an available number of luminance values in the luminance interval. In an embodiment, the first and second images are mosaic color images, the luminance value of each pixel represents a luminance level of a single color of a color base. In an embodiment, pixels of the first and second images are grouped in elementary macroblocks of pixels having a same base color distribution pattern. In an embodiment, the luminance value determined for a pixel of the second image is proportional to a weighted average of luminance values of pixels of a macroblock containing the pixel. In an embodiment, a same gain is applied to all pixels of a macroblock of the second image. In an embodiment, luminance values of pixels of the first image are coded over a smaller number of bits than luminance values of pixels of the second image.

In an embodiment, a device comprises: an input block configured to determine a luminance value of each pixel of a digital image; a luminance interval divider configured to divide a luminance interval between a lowest determined luminance value and a highest determined luminance value of the pixels of the digital image into a plurality of sub-intervals; and an output block configured to determine a luminance value of at least one pixel of an output image based on a determined luminance value of a pixel of the digital image and a gain, the output block being configured to determine the gain by interpolation based on a distance of the luminance value of the pixel of the digital image to limits of a sub-interval containing the determined luminance value of the pixel of the digital image. In an embodiment, the device includes a histogram generator configured to generate a first histogram H representative of a distribution of luminance values in the digital image. In an embodiment, the first histogram comprises a number of discrete values smaller than a total number of available discrete values for luminance values of the digital image. In an embodiment, the luminance interval divider is configured to divide the luminance interval into sub-intervals based on dichotomous division in which, at each step of division of an initial interval or sub-interval ranging from a value $L_{min}$ to a value $L_{max}$:

an intermediate value β of the interval or sub-interval is determined, such that:

$$\sum_{k=L_{min}}^{\beta} H(k) = \sum_{k=\beta}^{L_{max}} H(k),$$

where k designates luminance values for which a histogram value H(k) has been calculated; and a cut point C of the initial interval or sub-interval is determined, such that:

$$C = \frac{L_{max} + L_{min}}{2} + \alpha\left(\beta - \frac{L_{max} + L_{min}}{2}\right)$$

where α designates a control parameter greater than or equal to 0 and smaller than or equal to 1. In an embodiment, a number of sub-intervals into which said interval is divided is smaller than an available number of luminance values in the luminance interval. In an embodiment, pixels of the digital image are grouped in elementary macroblocks of pixels having a same base color distribution pattern. In an embodiment, the input block is configured to determine a luminance value of a pixel of the digital image based on a weighted average of luminance values of pixels of a macroblock containing the pixel. In an embodiment, a same gain is applied to all pixels of a macroblock of the digital image. In an embodiment, luminance values of pixels of the output image are coded over a smaller number of bits than luminance values of pixels of the digital image.

In an embodiment, a system comprises: an image acquisition device configured to acquire a first digital image; and a processing device coupled to the image acquisition device and configured to generate, using a configured digital processing device, a second digital image from the first digital image, by: determining a luminance value of each pixel of the first image; dividing a luminance interval, the luminance interval ranging from a lowest determined luminance value to a highest determined luminance of the pixels of the first image, into a plurality of sub-intervals; and determining a luminance value of at least one pixel of the second image by multiplying the determined luminance value of a pixel of the first image by a gain determined by interpolation based on a distance of the luminance value of the pixel of the first image to limits of a sub-interval containing the determined luminance value of the pixel of the first image. In an embodiment, the system includes a memory coupled between the image acquisition device and the processing device and configured to store the first image. In an embodiment, the processing device is configured to: group pixels of the first image into elementary macroblocks of pixels having a same base color distribution pattern; determine a luminance value of a pixel of the first image based on a weighted average of luminance values of pixels of a macroblock containing the pixel; and apply a same gain to all pixels of the macroblock.

The foregoing and other features and advantages will be discussed in detail in the following non-limiting description of specific embodiments in connection with the accompanying drawings.

DETAILED DESCRIPTION

Figure 1:
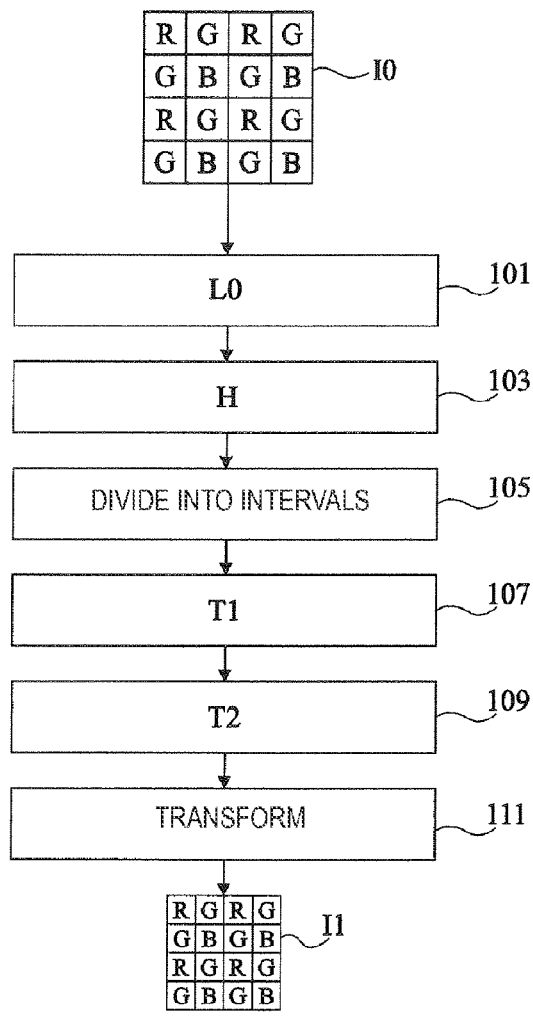
FIG. 1 is a diagram illustrating, in the form of blocks, an example of an embodiment of a tone mapping method.

A tone mapping method has been provided in the article entitled "Fast Tone Mapping for High Dynamic Range Images" by Jiang Duan et al.

In this method, it is started from an input color image, where the value of each pixel comprises three components respectively representing the red, green, and blue levels of the pixel, and it is desired to generate a color output image of lower dynamic range, where the number of tones available to represent each color component of each image pixel is smaller than in the input image.

For each pixel of the input image, a luminance value, that is, a weighted average of the red, green, and blue components of the pixel is calculated, after which the logarithm of the luminance is calculated. A complete logarithmic luminance histogram of the image is then calculated, after which a complete cumulative logarithmic luminance histogram of the image is calculated. The interval of values ranging from the lowest logarithmic luminance value to the highest logarithmic luminance value of the image (or dynamic logarithmic luminance interval of the image) is then divided, by dichotomy, into as many elementary intervals as there are tones to depict the scene in the output image. At each step of the dichotomous division, an initial interval $[L_{min}, L_{max}]$ is divided into two intervals according to the following method:

An intermediate value $\beta_i$ of the initial interval is determined, such that the number of pixels in the input image having the logarithm of its luminance ranging from value $L_{min}$ to value $\beta_i$ is equal to the number of pixels in the image having the logarithm of its luminance ranging from value $\beta_i$ to value $L_{max}$.

A cut point $C_0$ of the initial interval is then calculated according to the following formula:

$$C = \frac{L_{max} + L_{min}}{2} + \alpha\left(\beta - \frac{L_{max} + L_{min}}{2}\right)$$

where $\alpha$ designates a control parameter greater than or equal to 0 and smaller than or equal to 1. The initial interval $[L_{min}, L_{max}]$ is then divided into two intervals $[L_{min}, C_0]$ and $[C_0, L_{max}]$.

Once the dynamic logarithmic luminance interval of the image has been divided into as many elementary intervals as there are available tones to depict the scene in the output image, it is provided to assign a same luminance value in the output image to all the pixels of the input image having the logarithm of their luminance contained within a same elementary interval. In each pixel of the output image, the red, green, and blue components are then reconstructed by taking into account the value of the corresponding pixel in the input image and the luminance assigned to the pixel in the output image.

A disadvantage of this method is that it requires complex calculations, which makes it especially incompatible with a use in a tone mapping system embarked in a portable image acquisition device, for example, a cell phone or an e-tablet comprising an image sensor. In particular, the steps of generation of an image in logarithmic luminance, of determination of the complete logarithmic luminance histogram, and of dichotomous division of the dynamic logarithmic luminance interval of the image, are particularly expensive in terms of calculation power.

Another disadvantage of this method is that it only enables to perform a tone mapping from color images where the value of each pixel comprises three components respectively representing the red, green, and blue levels of the pixel.

In practice, the digital images directly provided at the output of a color image sensor are mosaic images where the value of each pixel represents the level of a single color of a color base, for example, the red, green, and blue base. Indeed, in a color image sensor, a photodetector array is typically covered with a mosaic or array of colored filters, for example, a Bayer filter, assigning to each photodetector a single color of a color base. To be exploitable, the mosaic images provided by the sensor may be submitted to so-called demosaicing processings, aiming at reconstructing, based on the data provided by each of the monochrome photodetectors of the sensor, an image where the value of each pixel comprises a component of each of the base colors, which enables to represent a large number of colors. The tone mapping method described in the above-mentioned article can only take place after the demosaicing processings. In an embodiment of the present disclosure, a tone mapping method is capable of receiving an input image where the value of each pixel represents the level of a single color of a color base and of providing an output image of lower dynamic range having the same base color distribution pattern.

FIG. 1 is a diagram illustrating, in the form of blocks, an example of an embodiment of a tone mapping method.

In this example, it is started from a mosaic color image I0 where the value of each pixel represents the level of a single color of a color base, for example, the red (R), green (G), and blue (B) base, and it is desired to obtain a mosaic color image I1 of lower dynamic range of same resolution and having the same base color distribution pattern as image I0. Hereafter, n0 designates the number of bits used to code the value of each color component of each pixel of image I0, and n1 designates the number of bits used to code the value of each color component of each pixel of image I1, n0 and n1 being integers, and n0 being greater than n1 in this example. The described embodiment may however also be used to modify the tone distribution in an image without decreasing its dynamic range, that is, with n0 equal to n1, for example, to apply special effects, a gamma function, etc. The pixels of images I0 and I1 are gathered in elementary macroblocks of neighboring pixels, each macroblock comprising pixels of all the base colors, and all macroblocks having the same base color distribution pattern. The base color distribution in images I0 and I1 for example corresponds to the color distribution in a Bayer filter. As an example, the pixels are distributed in array macroblocks of two by two pixels, the pixels of coordinates (0, 0), (0, 1), (1, 0), and (1, 1) in each macroblock being respectively red, green, and blue, as illustrated in FIG. 1.

At a step 101, a luminance image L0 is determined from image I0. In this example, image L0 has the same resolution, that is, the same number of pixels as image I0. The value of each pixel of image L0 is proportional to a weighted average of the values of the pixels of the macroblock containing the corresponding pixel in image I0 (that is, the pixel having the same position in image I0). The values of the pixels of image L0 are for example coded over the same number of bits n0 as the values of each color component of the pixels of image I0. In this example, the values of the pixels of a same macroblock in image L0 are identical. Thus, a single luminance value per macroblock can be calculated in an embodiment, which facilitates reducing the number of calculation operations necessary to construct image L0. As a variation, it would be possible to only generate a luminance image comprising a number of pixels equal to the number of macroblocks of image I0, that is, having a resolution smaller by a factor two in lines and by a factor two in columns than image I0 in the case of macroblocks of 2×2 pixels.

At a step 103, a partial or sub-sampled histogram H of image L0 is determined. A partial or sub-sampled histogram in this example refers to a histogram representing the distribution in the image of a number of tones smaller than the total number of tones available to depict a scene in image L0 (that is, in this example, a histogram representing the distribution in the image of a number of tones smaller than $2^{n0}$ (two raised to power n0)). As an example, at step 103, a histogram H representing the distribution in the image of $2^{n0-2}$ (two raised to power (n0−2)) equidistant tones, that is, of one quarter of the tones available to depict a scene in image L0, is determined. More generally, the ratio of the number of tones represented in histogram H to the total number of tones capable of being represented in image L0 may have any other value ranging between 0 and 1.

At a step 105, the smallest luminance value $L0_{min}$ and the greatest luminance value $L0_{max}$ of image L0 are determined, and the interval ranging from value $L0_{min}$ to value $L0_{max}$ is divided, for example by dichotomy, into a number of intervals smaller than the total number of tones available to depict the scene in output image I1, that is, $2^{n1}$ (two raised to power n1) in this example. As an example, at step 105, interval [$L0_{min}$, $L0_{max}$] may be divided into a number of intervals smaller by a factor 16 than the number of tones available to depict the scene in image L1. More generally, the ratio of the total number of tones available to depict the scene in image L1 to the number of intervals determined at step 105 may have any other value greater than 1. As an example, at each step of the dichotomous division of interval [$L0_{min}$, $L0_{max}$], an initial interval from a value $L_{Imin}$ to a value $L_{Imax}$ greater than value $L_{Imin}$ is divided into two intervals according to the following method:

Determining, based on partial histogram H obtained at step 103, an intermediate value β of interval [$L_{min}$, $L_{max}$] such that:

$$\sum_{k=L_{min}}^{\beta} H(k) = \sum_{k=\beta}^{L_{max}} H(k),$$

where k is a number ranging from $L0_{min}$ to $L0_{max}$ designating the luminance values of image L0 for which a histogram value H(k) has been calculated at step 103. To achieve this, a partial cumulative histogram may be determined.

Determining a cut point $C_0$ of the initial interval according to the following formula:

$$C = \frac{L_{max} + L_{min}}{2} + \alpha\left(\beta - \frac{L_{max} + L_{min}}{2}\right)$$

where α designates a control parameter greater than or equal to 0 and smaller than or equal to 1, and in some embodiments ranging between 0 and 1. In an embodiment, control parameter α ranges between 0.4 and 0.6. Initial interval [$L_{min}$, $L_{max}$] is then divided into two sub-intervals [$L_{min}$, C] and [C, $L_{max}$].

Hereafter, n designates the number of intervals into which dynamic interval [$L0_{min}$, $L0_{max}$] of image L0 at step 105 is divided, and $k_{i-1}$ and $k_i$ designate the respective lower and upper limits of each of the n intervals, i being an integer varying from 1 to n. It should be noted that values k, of neighboring indexes are not necessarily equidistant, and depend on histogram H determined at step 103.

At a step 107, for each of values $k_i$, a gain $G_i=i/k_i$ is determined and a first table T1 of n gains is filled with the values of gains $G_i$.

At a step 109, by interpolation from first gain table T1, a second extended gain table T2 comprising a number of gains greater than number n of gains of table T1 is determined. In table T2, the gains of neighboring indexes correspond to equidistant values of luminance tones available to depict a scene in image L0. The number of gains of table T2 is selected to be at least equal to the total number of tones available to represent each color of the scene in output image I1, that is, $2^{n1}$ tones, and may be greater than this number to minimize approximation errors. For each luminance value lx for which a gain $G_{lx}$ to be written into table T2 is desired to be generated, interval [$k_{i-1}$, $k_i$] containing value lx is determined, after which gain $G_{lx}$ may be calculated according to the following formula:

$$G_{lx} = \frac{lx - k_{i-1}}{k_i - k_{i-1}}(G_i - G_{i-1}) + G_{i-1}.$$

Thus, gain $G_{lx}$ takes into account the distance of luminance value lx to the limits of the sub-interval containing this luminance. Table T2 then forms a look-up table defining a transfer function enabling to generate image I1 from image I0.

At a step 111, image I1 is generated by applying to image I0 the transfer function defined by gain table T2. For this purpose, for each macroblock of pixels of image I0, the luminance value of the macroblock is read from image L0 and, according to this luminance value, a corresponding gain to be applied to the macroblock is read from table T2. For each pixel of the macroblock, the pixel value is multiplied by the gain read from table T2, and the resulting value is coded over n1 bits and written into the corresponding pixel of image I1. Thus, all the pixels of a same macroblock are multiplied by a same gain value, which facilitates avoiding unwanted distortions of the image.

An embodiment of the method described in relation with FIG. 1 may be implemented directly at the output of a color image sensor, before demosaicing of the mosaic images provided by the sensor. As an example, such a method may be used at the output of an image acquisition device capable of generating a high dynamic range mosaic color image, to perform a tone mapping towards a mosaic color image compatible with equipment of lower dynamic range such as a memory, a display, etc. It may be for example be provided that only the low dynamic range output image is submitted to a demosaicing processing, which enables to decrease the complexity of demosaicing operations. Further, a color image sensor integrating a tone mapping function integrated on the same semiconductor chip as the sensor may be provided.

In an embodiment of the method described in relation with FIG. 1, the calculation power necessary to implement the method is smaller than the calculation power necessary to implement the method described in Duan et al.'s above-mentioned article. An embodiment of the method described herein comprises fewer luminance calculation operations than Duan et al.'s method, comprises no logarithm calculation, comprises no determination of a complete histogram of an image, comprises no determination of a complete cumulative histogram of an image, provides a dichotomous division of the dynamical interval of an image having a lower division resolution than in Duan et al.'s method, and converts values into gains.

An embodiment of the method described in relation with FIG. 1 is compatible with a use in a tone mapping system embarked in a portable image acquisition device, for example, a cell phone or an e-tablet comprising an image sensor.

It should be noted that steps 101, 103, 105, 107, 109, and 111 may be implemented by configuring a digital signal processing device, for example, a device comprising a microcontroller or dedicated circuits to perform one or more of the steps of the method.

Figure 2:
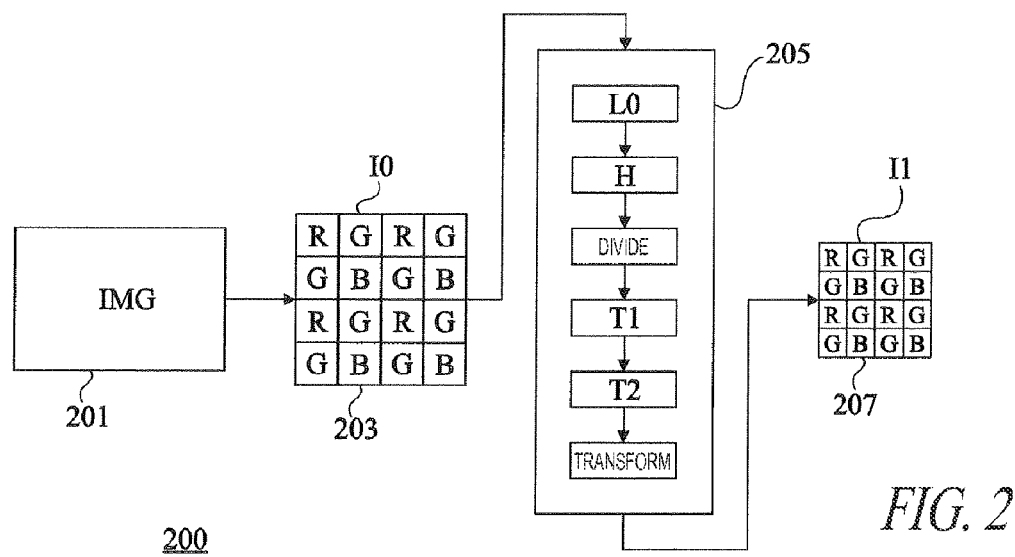
FIG. 2 is a diagram illustrating, in the form of blocks, an embodiment of an image acquisition device comprising a tone mapping device.

FIG. 2 schematically illustrates, in the form of blocks, an embodiment of a device 200 comprising an image acquisition device 201 (IMG) comprising a color sensor. Image acquisition device 201 is capable of generating a high dynamic range mosaic color image I0. Device 200 comprises a memory 203 configured to store image I0. Device 200 further comprises a processing circuit 205 configured to generate, from image I0, a mosaic color image I1 of lower dynamic range (or of identical dynamic range however having a different tone distribution), according to a method of the type described in relation with FIG. 1. Device 200 further comprises a memory 207 configured to store output image I1. As an example, image acquisition device 201 and processing circuit 205 may be formed on a same integrated circuit chip.

Specific embodiments have been described. Various alterations, modifications, and improvements will occur to those skilled in the art. In particular, the described embodiments are not limited to the above-mentioned specific case were the tone mapping function is associated with an image acquisition device. The described embodiments also aim at the case where the tone mapping function is dissociated from an image acquisition device and is for example implemented on a computer by means of image processing software.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
generating, using a configured digital processing device, a first digital image from a second digital image, by:
determining a luminance value of each pixel of the second image;
dividing a luminance interval ranging from a lowest determined luminance value to a highest determined luminance of the pixels of the second image into a plurality of sub-intervals; and
determining a luminance value of at least one pixel of the first image by multiplying the determined luminance value of a pixel of the second image by a gain determined by interpolation based on a distance of the luminance value of the pixel of the second image to limits of a sub-interval containing the determined luminance value of the pixel of the second image.

2. The method of claim 1, comprising generating a first histogram H representative of a distribution of luminance values in the second image.

3. The method of claim 2 wherein the first histogram comprises a number of discrete values smaller than a total number of available discrete values for luminance values of the second image.

4. The method of claim 2, comprising determining a second cumulative histogram based on the first histogram.

5. The method of claim 2 wherein dividing the luminance interval into sub-intervals comprises dichotomous division in which, at each step of division of an initial interval or sub-interval ranging from a value $L_{min}$ to a value $L_{max}$:
an intermediate value $\beta$ of the interval or sub-interval is determined, such that:

$$\sum_{k=L_{min}}^{\beta} H(k) = \sum_{k=\beta}^{L_{max}} H(k),$$

where k designates luminance values for which a histogram value H(k) has been calculated; and
a cut point C of the initial interval or sub-interval is determined, such that:

$$C = \frac{L_{max} + L_{min}}{2} + \alpha\left(\beta - \frac{L_{max} + L_{min}}{2}\right)$$

where $\alpha$ designates a control parameter greater than or equal to 0 and smaller than or equal to 1.

6. The method of claim 5 wherein control parameter $\alpha$ ranges between 0.4 and 0.6.

7. The method of claim 1 wherein a number of sub-intervals into which said interval is divided is smaller than an available number of luminance values in the luminance interval.

8. The method of claim 1 wherein the first and second images are mosaic color images, the luminance value of each pixel represents a luminance level of a single color of a color base.

9. The method of claim 8 wherein pixels of the first and second images are grouped in elementary macroblocks of pixels having a same base color distribution pattern.

10. The method of claim 9 wherein the luminance value determined for a pixel of the second image is proportional to a weighted average of luminance values of pixels of a macroblock containing the pixel.

11. The method of claim 9 wherein a same gain is applied to all pixels of a macroblock of the second image.

12. The method of claim 1 wherein luminance values of pixels of the first image are coded over a smaller number of bits than luminance values of pixels of the second image.

13. A device, comprising:
a memory; and
image processing circuitry, which, in operation,
  determines a luminance value of each pixel of a digital image;
  divides a luminance interval between a lowest determined luminance value and a highest determined luminance value of the pixels of the digital image into a plurality of sub-intervals; and
  determines a luminance value of at least one pixel of an output image based on a determined luminance value of a pixel of the digital image and a gain, wherein the gain is determined by interpolation based on a distance of the luminance value of the pixel of the digital image to limits of a sub-interval containing the determined luminance value of the pixel of the digital image.

14. The device of claim 13 wherein the image processing circuitry, in operation, generates a first histogram H representative of a distribution of luminance values in the digital image.

15. The device of claim 14 wherein the first histogram comprises a number of discrete values smaller than a total number of available discrete values for luminance values of the digital image.

16. The device of claim 14 wherein the image processing circuitry, in operation, divides the luminance interval into sub-intervals based on dichotomous division in which, at each step of division of an initial interval or sub-interval ranging from a value $L_{min}$ to a value $L_{max}$:
an intermediate value $\beta$ of the interval or sub-interval is determined, such that:

$$\sum_{k=L_{min}}^{\beta} H(k) = \sum_{k=\beta}^{L_{max}} H(k),$$

where k designates luminance values for which a histogram value H(k) has been calculated; and
a cut point C of the initial interval or sub-interval is determined, such that:

$$C = \frac{L_{max} + L_{min}}{2} + \alpha\left(\beta - \frac{L_{max} + L_{min}}{2}\right)$$

where $\alpha$ designates a control parameter greater than or equal to 0 and smaller than or equal to 1.

17. The device of claim 13 wherein a number of sub-intervals into which said interval is divided is smaller than an available number of luminance values in the luminance interval.

18. The device of claim 13 wherein pixels of the digital image are grouped in elementary macroblocks of pixels having a same base color distribution pattern.

19. The device of claim 18 wherein the image processing circuitry, in operation, determines a luminance value of a pixel of the digital image based on a weighted average of luminance values of pixels of a macroblock containing the pixel.

20. The device of claim 18 wherein a same gain is applied to all pixels of a macroblock of the digital image.

21. The device of claim 13 wherein luminance values of pixels of the output image are coded over a smaller number of bits than luminance values of pixels of the digital image.

22. A system, comprising:
image acquisition circuitry, which, in operation, acquires a first digital image; and
image processing circuitry, couple to the image acquisition circuitry, and which, in operation, generates a second digital image from the first digital image, by:
  determining a luminance value of each pixel of the first image;
  dividing a luminance interval, the luminance interval ranging from a lowest determined luminance value to a highest determined luminance of the pixels of the first image, into a plurality of sub-intervals; and
  determining a luminance value of at least one pixel of the second image by multiplying the determined luminance value of a pixel of the first image by a gain determined by interpolation based on a distance of the luminance value of the pixel of the first image to limits of a sub-interval containing the determined luminance value of the pixel of the first image.

23. The system of claim 22, comprising a memory coupled between the image acquisition circuitry and the image processing circuitry and configured to store the first image.

24. The system of claim 22 wherein the image processing circuitry is configured to:
group pixels of the first image into elementary macroblocks of pixels having a same base color distribution pattern;
determine a luminance value of a pixel of the first image based on a weighted average of luminance values of pixels of a macroblock containing the pixel; and
apply a same gain to all pixels of the macroblock.

* * * * *